UNITED STATES PATENT OFFICE.

MAX BUFF, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

BLUE VAT DYE.

998,156.　　　Specification of Letters Patent.　　Patented July 18, 1911.

No Drawing.　　Application filed April 11, 1911.　Serial No. 620,425.

*To all whom it may concern:*

Be it known that I, MAX BUFF, doctor of philosophy, chemist, citizen of the German Empire, residing at Vohwinkel, near Elberfeld, Germany, have invented new and useful Improvements in Blue Vat Dye, of which the following is a specification.

I have found that new and valuable vat dyes can be obtained by condensing 1-amino-4-bromo-anthraquinone substituted in the amino group with isatin. The dyes thus obtained are after being dried and pulverized dark powders yielding with caustic soda lye and hydro-sulfite vats dyeing cotton fast blue.

The process probably proceeds in accordance with the following equation:

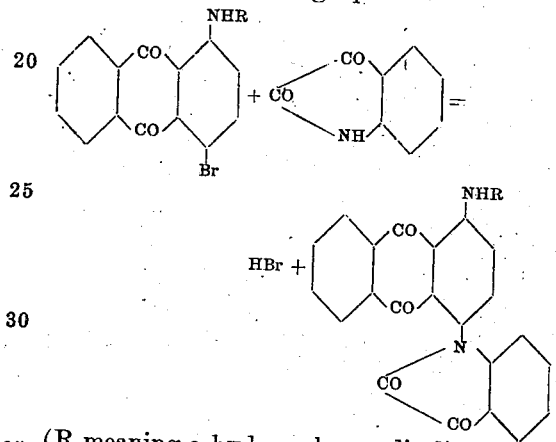

(R meaning a hydrocarbon radical).

In order to illustrate the new process more fully the following example is given, the parts being by weight:—31.6 parts of 1-methylamino-4-bromoanthraquinone are suspended together with 14.7 parts of isatin in 150 parts of nitrobenzene. This mixture is then heated to boiling while being stirred for 10 hours with the addition of 20 parts of sodium acetate and 5 parts of cuprous chlorid. After the solution has cooled the crystalline condensation product is removed by filtration and washed with alcohol and water. It is a dark blue powder which is rather difficultly soluble in most organic solvents. Concentrated sulfuric acid dissolves it with a brown color. With hydro-sulfite and NaOH the new product yields a brown vat from which cotton is dyed a greenish-blue shade, fast to light.

I claim:—

1. The herein described new dyestuffs having probably the following general formula:

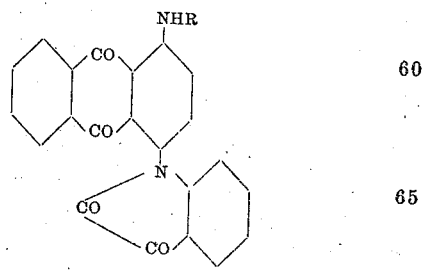

R meaning a hydrocarbon radical, which are after being dried and pulverized dark powders yielding vats with caustic soda lye and hydrosulfite which dye cotton blue fast shades, substantially as described.

2. The herein described new dyestuff having probably the formula:

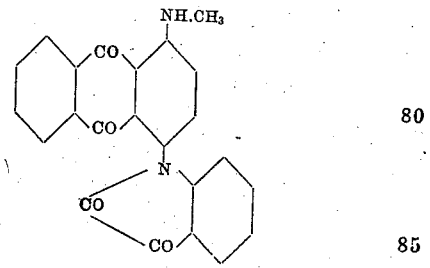

which is after being dried and pulverized a dark-blue powder rather difficultly soluble in most organic solvents, soluble in concentrated sulfuric acid with a brown color; yielding with hydrosulfite and NaOH a brown vat dyeing cotton blue, substantially as described.

In testimony whereof I have hereunto set my hand in the presence of two subscribing witnesses.

MAX BUFF. [L. S.]

Witnesses:
ALFRED HENKEL,
N. SIRCKE.